(12) United States Patent
Baumann et al.

(10) Patent No.: US 7,484,601 B2
(45) Date of Patent: Feb. 3, 2009

(54) SELF-BOOSTING ELECTROMECHANICAL DISK BRAKE

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE);
Bernd Goetzelmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 10/962,435

(22) Filed: Oct. 13, 2004

(65) Prior Publication Data
US 2005/0109566 A1    May 26, 2005

(30) Foreign Application Priority Data
Oct. 15, 2003   (DE) ................................ 103 47 942

(51) Int. Cl.
*F16D 55/14* (2006.01)
(52) U.S. Cl. .................. 188/72.2; 188/71.7; 188/71.9; 188/73.45
(58) Field of Classification Search ........... 188/72.2, 188/71.7, 71.8, 71.9, 79.51, 79.56, 196 R, 188/196 V, 156, 70 B, 70 R, 72.8, 73.44, 188/73.45, 202, 196 B
See application file for complete search history.

(56) References Cited

U.S. PATENT DOCUMENTS

| | | | | |
|---|---|---|---|---|
| 3,357,528 A | * | 12/1967 | Verlinde | 188/171 |
| 3,470,987 A | * | 10/1969 | Kroeger | 188/171 |
| 3,800,920 A | * | 4/1974 | Warwick | 188/106 F |
| 4,640,397 A | * | 2/1987 | Santalini | 192/18 B |
| 5,161,648 A | * | 11/1992 | Taig | 188/71.1 |
| 6,318,513 B1 | * | 11/2001 | Dietrich et al. | 188/72.7 |
| 6,397,977 B1 | * | 6/2002 | Ward | 188/1.11 L |
| 6,471,017 B1 | * | 10/2002 | Booz et al. | 188/72.7 |
| 2005/0029056 A1 | * | 2/2005 | Baumgartner et al. | 188/1.11 L |

* cited by examiner

*Primary Examiner*—Robert A Siconolfi
*Assistant Examiner*—Mariano Sy
(74) *Attorney, Agent, or Firm*—Ronald E. Greigg

(57) ABSTRACT

The invention relates to a self-boosting electromechanical disk brake with a frame caliper equipped with a wear readjustment device which for instance is automatic and which upon tensing of the disk brake stores energy by prestressing a torsion shaft, which upon release of the disk brake converts this energy into a wear readjustment motion. In the process, a spacing between two brake lining holders of the frame caliper in the disk brake is decreased.

9 Claims, 2 Drawing Sheets

SELF-BOOSTING ELECTROMECHANICAL DISK BRAKE

BACKGROUND OF THE INVENTION

1. Field of the Invention

The invention relates to an improved self-boosting electromechanical disk brake which is intended in particular for use as a wheel brake in motor vehicles.

2. Description of the Prior Art

One self boosting electromechanical disk brake known from German Patent Disclosure DE 101 51 950 A1 has a floating caliper of U-shaped cross section as its brake caliper, which fits over a brake disk on the circumference and in which two friction brake linings are located, one on either side of a brake disk. The brake caliper is supported displaceably transversely to the brake disk and is accordingly what is known as a floating caliper. However, the use of a fixed caliper is equally possible.

For actuation, the known disk brake has an electromechanical actuating device, with which a friction brake lining can be pressed against one side of the brake disk. As a result of the one friction brake lining being pressed against one side of the brake disk, the caliper is displaced transversely to the brake disk and presses the other friction brake lining against the other side of the brake disk, as a result of which the brake disk is braked. The electromechanical actuating device has an electric motor, an optional step-down gear, and a rotation-to-translation conversion gear. The most various kinds of gears may be used; besides gear drives, a rotatable cam as a rotation-to-translation conversion gear can for instance also be considered. Instead of an electric motor, an electromagnet can be used, for instance. In the generic terminology here, the adjective "electromechanical" accordingly refers to the type of actuation of the disk brake.

As its self-boosting device, the known disk brake has a wedge mechanism, with a wedge disposed on a back side, remote from the brake disk, of one friction brake lining; this wedge is braced on an oblique face in the caliper. The oblique face extends obliquely to the brake disk; there is a wedge-shaped gap between the oblique face and the brake disk that becomes narrower in a circumferential direction to the brake disk, specifically in the intended direction of rotation of the brake disk. If the friction brake lining is pressed against the rotating brake disk for actuation of the disk brake, then the rotating brake disk exerts a frictional force on the friction brake lining in the circumferential direction, and thus in the direction of the increasingly narrow wedge-shaped gap between the oblique face and the brake disk. Because of the principle of a wedge, the oblique face exerts a force on the friction brake lining, which includes a force component transverse to the brake disk. This force component transverse to the brake disk is a contact pressure, which presses the friction brake lining against the brake disk in addition to a contact pressure exerted by the actuating device. In this way, the contact pressure exerted by the actuating device is increased, and self boosting occurs. The wedge mechanism converts a frictional force, exerted by the rotating brake disk on the friction brake lining pressed against it, into a contact pressure of the friction brake lining against the brake disk. The wedge and the oblique face need not have a constant wedge angle over their entire length; the wedge angle may vary as a function of a displacement distance of the friction brake lining along the oblique face. In that case, the term ramp mechanism may be used. Preferably at the onset of tensing the disk brake, a large wedge angle or ramp angle is selected, for the sake of rapidly overcoming an air play between the friction brake linings and the brake disk. At the end of the tensing, when the braking force and contact pressure are high, a small wedge angle or ramp angle and consequently high self boosting are preferably selected.

To attain self boosting even for the reversed direction of rotation of the brake disk (travel in reverse), it is known to use a second wedge mechanism with an oppositely disclosed wedge and an oppositely extending oblique face. The wedge angle can differ for travelling forward and travelling in reverse, in order to attain self boosting actions of different strengths.

Other self-boosting devices are also known, for instance with one or more support levers that brace the friction brake lining, pressed against the brake disk, obliquely at a support angle to the brake disk. The support angle is equivalent to the wedge angle of the wedge mechanism.

The self-boosting disk brakes share the feature that the friction brake lining, for attaining the self boosting, is moved in the circumferential direction or the direction of rotation of the brake disk, and this motion, or the frictional force exerted by the brake disk on the friction brake lining pressed against it, is converted into a contact pressure of the friction brake lining against the brake disk. With decreasing thickness of the friction brake lining caused by wear, the displacement distance of the friction brake lining in the circumferential direction or the direction of rotation of the brake disk becomes greater. A displacement distance of the friction brake lining for attaining a defined braking force is lengthened as a result. This has the disadvantage that the time until a desired braking force is attained is lengthened. Another disadvantage is that a sufficiently large installation space for displacing the (worn) friction brake lining must be provided. In electromechanical disk brakes, in which some parts of the actuating device, of the floating caliper, or of a housing are displaced along with the friction brake lining, space problems can arise.

OBJECT AND SUMMARY OF THE INVENTION

The disk brake of the invention has a frame caliper with two brake lining holders and with tie rods that connect the brake lining holders outside the brake disk. The brake lining holders are plate-shaped, for instance, and the brake disk is located between them. The friction brake linings are disposed on the side of the brake lining holders oriented toward the brake disk. In comparison to a floating caliper, a frame caliper has the advantage that it can be embodied such that the tie rods that connect the brake lining holders are stressed essentially only by tension as a result of the pressing of the friction brake linings against the brake disk, while conversely a floating caliper is stressed by bending in the yoke region, which is unfavorable for the sake of stability and rigidity of the caliper. The brake lining holders of the frame caliper can be connected on both ends by tie rods, which in terms of the mechanical stress is also more favorable than is the case for the legs of a floating caliper, whose radially inner edges, in terms of the brake disk, are free.

To compensate for wear, the brake lining holders of the disk brake of the invention are displaceable along the tie rods, so that a spacing of the brake lining holders from one another can be varied. In other words, an inside diameter of the frame caliper in the disk brake of the invention is adjustable. As a result, an air play, that is, a gap between the friction brake linings and the brake disk when the disk brake is not actuated, can be kept constant with increasing wear and decreasing thickness of the friction brake linings. Thus the disk brake of the invention has a wear readjustment. This has the advantage that the displacement distance of the friction brake lining in the circumferential direction or direction of rotation of the brake disk is independent of a thickness of the friction brake lining. Another advantage is that the displacement distance of the friction brake lining is not lengthened with increasing wear and decreasing thickness of the friction brake lining. In a self-boosting device with variable self boosting over a displacement distance of a friction brake lining, the disk brake of the invention has the advantage that the magnitude of the self boosting does not change as a result of a displacement distance that has become longer because of wear of the friction brake lining. Even with a variable step-up, i.e., speed increase, of the electromechanical actuating device, wear to the friction brake lining does not change the step-up.

BRIEF DESCRIPTION OF THE DRAWINGS

The invention will be better understood and further objects and advantages thereof will become more apparent from the ensuing detailed description of preferred embodiments, taken in conjunction with the drawings, in which.

DESCRIPTION OF THE PREFERRED EMBODIMENTS

Figure 1:
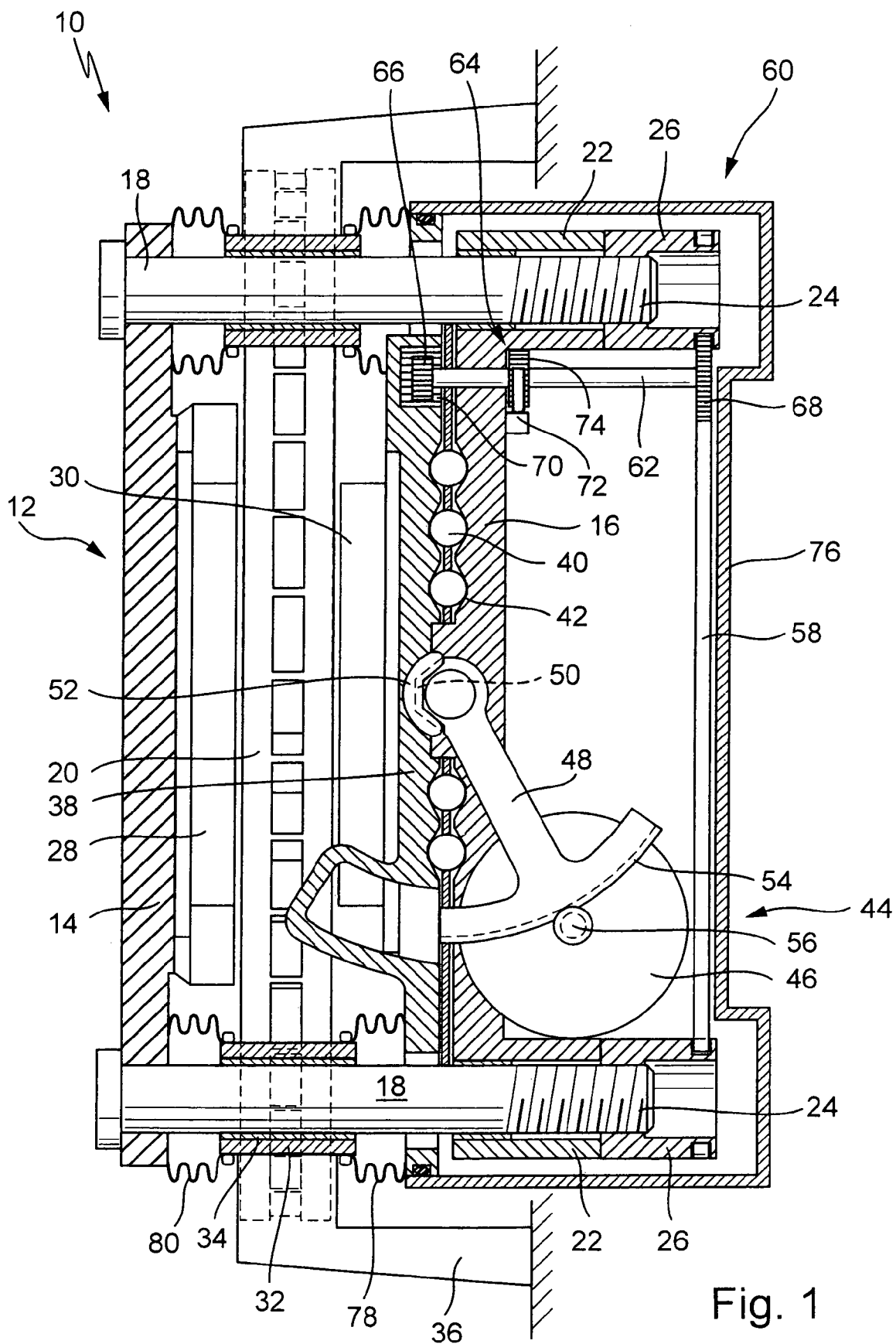
FIG. 1 shows a first exemplary embodiment, partly in section, of a disk brake of the invention, in a view looking radially toward a brake disk.

The self-boosting electromechanical disk brake 10 of the invention, shown in FIG. 1, is a so-called partial-lining disk brake; its friction brake linings extend over only a limited angle in the circumferential direction of a brake disk 20. It has a frame caliper 12 with two brake lining holders 14, 16 and two anchor bolts 18, which as tie rods join the brake lining holders 14, 16. The brake lining holders 14, 16 are embodied as plates; they are parallel to one another and parallel to the brake disk 20 that is located between them. The tie rods 18 connect the brake lining holders 14, 16 on their ends, outside a circumference of the brake disk 20. The anchor bolts 18 are disposed transversely to the brake disk 20 and to the brake lining holders 14, 16. The anchor bolts 18 are firmly press-fitted into the brake lining holder 14. The other brake lining holder 16 has sleeves 22, in which the anchor bolts 18 rest displaceably. The sleeves 22 protrude from a side, remote from one brake lining holder 14 and the brake disk 20, of the other brake lining holder 16. The anchor bolts 18 are provided with screw threads 24 on their ends located in the sleeves 22. The anchor bolts 18 protrude from the sleeves 22, and nuts 26 are screwed onto the protruding ends of the anchor bolts 18; these nuts are seated on end edges of the sleeves 22 and in this way keep the two brake lining holders 14, 16 at the intended spacing from one another.

On the sides of the brake lining holders 14, 16 toward the brake disk 20, friction brake linings 28, 30 are provided. The anchor bolts 18 and the brake lining holders 14, 16 are located at approximately the same height as the centers of area of the friction brake linings 28, 30. As a result, when the friction brake linings 28, 30 are pressed against the brake disk 20 for braking, the tie rods 18 are stressed only slightly if at all by bending and the brake lining holders 14, 16 are stressed only slightly if at all by torsion.

Between the brake lining holders 14, 16, slide sleeves 32 are placed on the anchor bolts 18. Slide bearing bushes 34 are inserted into the slide sleeves 32, and the slide sleeves 32 are provided with a grease filling. The slide sleeves 32 are part of a brake holder 36, which holds the disk brake 10. The anchor bolts 18 are supported transversely to the brake disk 20 in the slide sleeves 32. The caliper of the disk brake 10, embodied as a frame caliper 12, is accordingly a floating caliper that can be displaced transversely to the brake disk 20. The slide sleeves 32 are disposed in the same imaginary plane as the brake disk 20 and as a result brace the frame caliper 12 in braking without torque.

On a side of the other brake lining holder 16 oriented toward the brake disk 20, there is a ramp plate 38. The ramp plate 38 and the brake lining holder 16 are provided, on their sides toward one another, with tub or dish-shaped, elongated indentations in which balls 40 as roller bodies are located. The indentations extend for instance straight in a direction of a secant to the brake disk 20 or in a circular arc about an imaginary, common axis that intersects the brake disk 20 at a right angle and preferably coincides with an axis of rotation of the brake disk 20. In this way, the balls 40 guide the ramp plate 38 displaceably in the secant direction or in a circular arc in the direction of rotation of the brake disk 20.

The ramp plate 38, on its side remote from the other brake lining holder 16 and toward the brake disk 20, carries the friction brake lining 30. The friction brake lining 30 is accordingly not disposed directly on the brake lining holder 16, but instead only indirectly, via the ramp plate 38 guided displaceably on the brake lining holder 16.

For actuation of the disk brake 10, the ramp plate 38 is displaced parallel to the brake disk 20, in the direction of rotation of the brake disk. The balls 40 roll in the tub-shaped indentations and, since the indentations become shallower toward their ends, the balls press the ramp plate 38 away from the brake lining holder 16. As a result, the ramp plate 38, with the friction brake lining 30 disposed on it, moves obliquely toward the brake disk 20; the friction brake lining 30 is pressed against the brake disk 20. Upon further displacement of the ramp plate 38, the brake lining holder 16, via the anchor bolts 18, pulls brake lining holder 14 toward the brake disk 20 and as a result presses the friction brake lining 28 against the other side of the brake disk 20, which is thereby braked. The rotating brake disk 20 exerts a frictional force on the friction brake linings 28, 30 pressed against it, and this force urges the ramp plate 38 in the direction of rotation of the brake disk 20 and thus in the displacement direction of the brake disk. The frictional force exerted by the rotating brake disk 20 on the friction brake lining 30 thus exerts an additional force on the ramp plate 38 in its direction of displacement, which by way of the bracing of the ramp plate 38 with the balls 40 on the brake lining holder 16 exerts an additional contact pressure of the friction brake linings 28, 30 against the brake disk 20. In this way, brake boosting takes place, and the disk brake 10 has a mechanical self boosting. The indentations in the ramp plate 38 and in the brake lining holder 16, in which the balls 40 are located, form ramps 42; the balls 40, ramps 42, ramp plate 38, and the brake lining holder 16 form a wedge or ramp mechanism, which effects the mechanical self boosting upon actuation of the disk brake 10.

For actuation of the disk brake 10, that is, for displacement of the ramp plate 38, the disk brake 10 has an electromechanical actuating device 44, with an electric motor 46 and a pivot lever 48. The pivot lever 48 is supported pivotably on the brake lining holder 16. In the region of its pivot bearing, the pivot lever 48 is provided with a set of teeth 50, which meshes with a set of teeth 52 on the ramp plate 38. The two sets of teeth 50, 52 extend such that they remain in engagement with one another upon pivoting of the pivot lever 48 and the attendant displacement of the ramp plate 38.

On the end remote from its pivot bearing, the pivot lever 48 is provided with a set of teeth 54, which extends in a circular arc coaxially about an imaginary pivot axis of the pivot lever 48. This set of teeth 54 meshes with a pinion 56, which is fixed against relative rotation to a motor shaft of the electric motor 46. For actuation of the disk brake 10, the ramp plate 38 is displaced in the direction of rotation of the brake disk 20 in order to attain the desired self boosting.

The two nuts 26 screwed onto the anchor bolts 18 are part of a wear readjustment device. By synchronous rotation of the nuts 26 on the anchor bolts 18, a spacing of the two brake lining holders 14, 16 from one another can be adjusted, and as a result, wear to the two friction brake linings 28, 30 can be compensated for. For the sake of the synchronous rotation of the nuts 26, there is a toothed belt 58, which wraps around the nuts 26 and is in engagement with sets of teeth on the nuts 26. The toothed belt 58 forms a synchronous drive for the nuts 26.

For wear-dependent rotation of the nuts 26, the disk brake 10 has an automatic readjusting device 60 with a torsion shaft 62 and a return block 64. The torsion shaft 62 is disposed parallel to the anchor bolts 18, near one of the two anchor bolts 18. It has gear wheels 66, 68 on both ends, of which one gear wheel 66 meshes with a set of teeth 70 of the ramp plate 38, and the other gear wheel 68 meshes with the teeth of one of the two nuts 26. As a result of the displacement of the ramp plate 38 upon actuation of the disk brake 10, the torsion shaft 62 is rotated, at least on one of its ends, and via its gear wheel 68, it exerts a torque on the nut 26.

The return block 64 is embodied like a ratchet; it has a pawl 72 that cooperates with a ratchet wheel 74 that is seated on the torsion shaft 62 in a manner fixed against relative rotation. The ratchet wheel 74 is a gear wheel with sawtooth-shaped teeth, which is rotatable in one direction of rotation (freewheeling direction), while conversely the pawl 72 prevents rotation in the opposite direction (blocking direction). In the blocking direction, a rotation of the ratchet wheel 74 as a function of its rotary position relative to the pawl 72 is possible by only one tooth length at maximum.

The function of the wear readjustment device 60 is as follows: If the ramp plate 38, for actuation of the disk brake 10, is displaced in the direction of rotation of the brake disk 20, then via its teeth 70 it rotates the gear wheel 66 and thus the torsion shaft 62. This rotation takes place in the freewheeling direction of the return block 64. Via its other gear wheel 68, the torsion shaft 62 rotates the nut 26. The direction of rotation is selected such that the spacing between the ramp plate 38 and one brake lining holder 14 decreases. When the friction brake linings 28, 30 are in contact with the brake disk 20, a torque for rotating the nuts 26 becomes greater, as a result of which the torsion shaft 62 rotates elastically within itself, or in other words twists. Upon release of the disk brake 10, the entire procedure takes place in reverse. If because of wear to the friction brake linings 28, 30 a rotation of the torsion shaft 62 upon actuation of the brake 10 is so great that the pawl 72 overcomes one tooth of the ratchet wheel 74, then the reverse rotation of the torsion shaft 62 upon release of the disk brake 10 decreases by one tooth length of the ratchet wheel 74. If upon release of the disk brake 10 the friction brake linings 28, 30 lift away from the brake disk, the nuts 26 become easily rotatable as a result; the elastically twisted torsion shaft 62 relaxes and in the process rotates the nuts 26, so that a spacing of the brake lining holders 14, 16 from one another decreases. As a result, the wear to the friction brake linings 28, 30 is compensated for.

Moving parts of the disk brake 10, in particular the actuating device 44 and the wear readjustment device 60, are accommodated in a housing 76, one wall of which is formed by the ramp plate 38. Bellows 78, 80 provide sealing between the ramp plate 38 and the slide sleeve 32 and between the slide sleeve 32 and one brake lining holder 14. The moving parts of the disk brake are thus protected from dirt and water.

Figure 2:
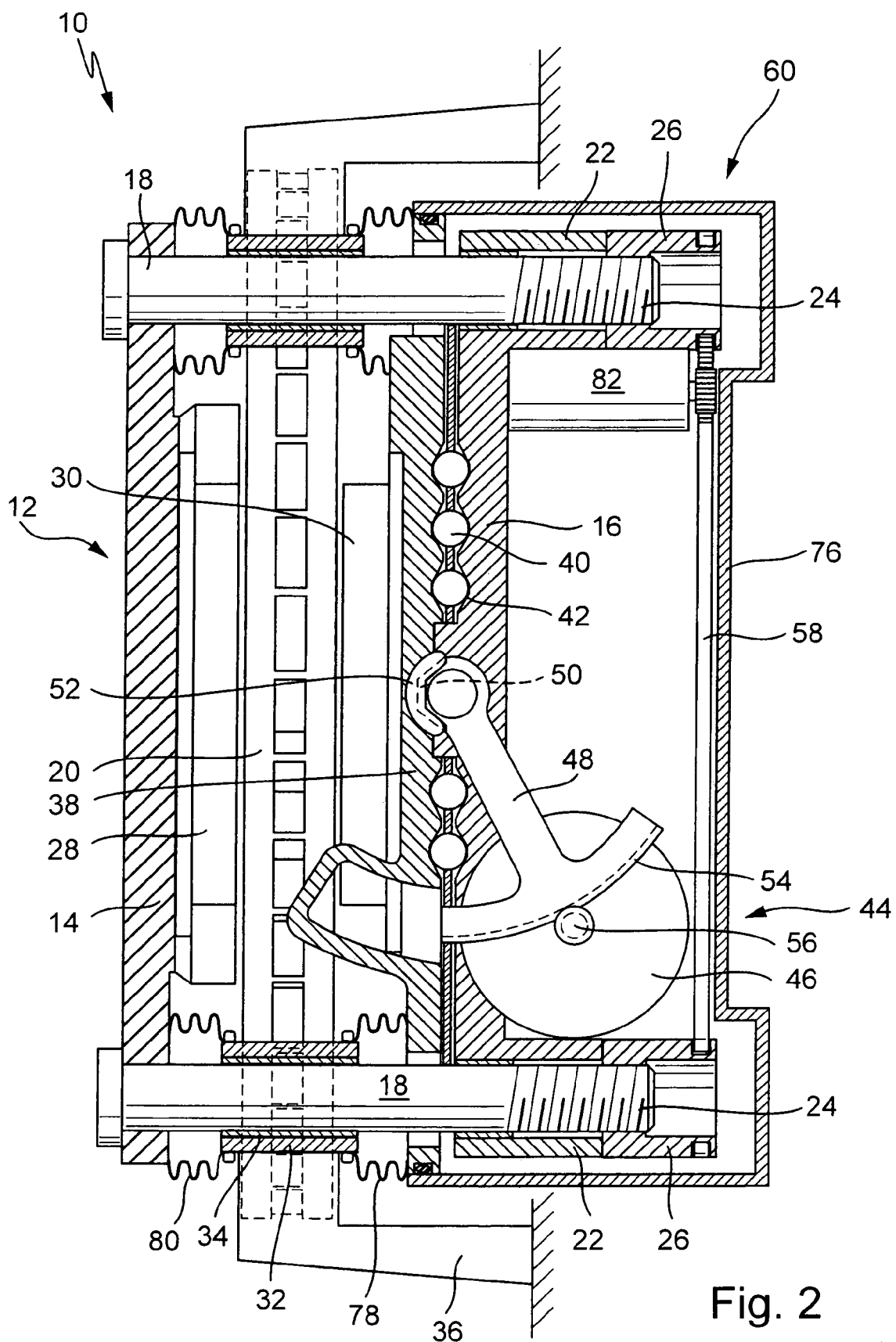
FIG. 2 shows a second embodiment of a disk brake of the invention, in a view corresponding to FIG. 1.

In the disk brake 10 shown in FIG. 2, instead of the torsion shaft 62, there is an electric motor 82 for rotating the nuts 26 of the wear readjustment device 60. The wear readjustment is accordingly accomplished electromechanically and not automatically by the displacement of the ramp plate 38 upon actuation of the disk brake 10. Otherwise, the disk brakes 10 shown in FIGS. 1 and 2 are constructed identically and function in the same way. To avoid repetition, see the above description of FIG. 1.

The foregoing relates to preferred exemplary embodiments of the invention, it being understood that other variants and embodiments thereof are possible within the spirit and scope of the invention, the latter being defined by the appended claims.

We claim:

1. An electromechanical self-boosting disk brake, comprising
an electromechanical actuating device (44), with which a friction brake lining (28, 30) can be pressed for braking against a brake disk (20),
a mechanical self boosting device, which converts a frictional force, exerted in braking by the rotating brake disk on the friction brake lining pressed against it, into a contact pressure that presses the friction brake lining against the brake disk,
a frame caliper (12), the frame caliper (12) having two brake lining holders (14, 16), between which the brake disk (20) is located, and two tie rods (18), which connect the two brake lining holders (14, 16) outside the brake disk (20),
friction brake linings (28, 30) disposed on sides of the brake lining holders (14, 16) oriented toward the brake disk (20); and
means for mounting one of the brake lining holders displaceably along the tie rods (18), so that a spacing of the brake lining holders (14, 16) from one another can be varied, wherein the frame caliper (12) is displaceable transversely to the brake disk (20), and wherein the frame caliper (12) comprises a slide bearing (32, 34), with which it is guided displaceably transversely to the brake disk (20); and wherein the slide bearing (32, 34) is disposed approximately in the same imaginary plane as the brake disk (20).

2. The disk brake in accordance with claim 1, wherein the disk brake (10) has anchor bolts (18) as tie rods, onto which nuts (26) are screwed that hold said one of the brake lining holders, so that by rotation of the nuts (26), the said one of the brake lining holders can be displaced along the anchor bolts (18) and the spacing of the two brake lining holders (14, 16) from one another can be varied.

3. The disk brake in accordance with claim 2, wherein the disk brake (10) further comprising a synchronous drive (58) for the nuts (26).

4. The disk brake in accordance with claim 1, wherein the disk brake (10) further comprising an electromechanical wear readjustment device (60) for displacing the said one of the brake lining holders.

5. The disk brake in accordance with claim 1, wherein the disk brake (10) further comprises a mechanical wear readjustment device (60) for displacing the said one of the brake lining holders, which device is driven by a motion of one friction brake lining (30) in the direction of rotation of the brake disk (20) and displaces the said one of the brake lining holders in the direction of the other brake lining holder (14).

6. The disk brake in accordance with claim 5, wherein the wear readjustment device (60) comprises a torsion element (62), which upon a motion of the said one of the brake lining holders in the direction of rotation of the brake disk (20) is tensed by the friction brake lining (30) and which upon release of the disk brake (10) urges the said one of the brake lining holders in the direction of one brake lining holder (14). and a return block (64) which allows only a limited restoration of the torsion element (62).

7. The disk brake in accordance with claim 6, wherein the torsion element (62) comprises a torsion shaft.

8. The disk brake in accordance with claim 1, wherein the disk brake (10) is embodied as a partial-lining disk brake.

9. The disk brake in accordance with claim 1, wherein the frame caliper (12) is displaceable transversely to the brake disk (20).

* * * * *